US011275479B2

(12) United States Patent
Noh et al.

(10) Patent No.: US 11,275,479 B2
(45) Date of Patent: Mar. 15, 2022

(54) FREQUENCY-BASED RATIOMETRIC FEATURE EXTRACTION DEVICE FOR USER AUTHENTICATION

(71) Applicant: ELECTRONICS AND TELECOMMUNICATIONS RESEARCH INSTITUTE, Daejeon (KR)

(72) Inventors: Hyung Wook Noh, Sejong (KR); Joo Yong Sim, Daejeon (KR); Chang-Geun Ahn, Sejong (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 17/148,269

(22) Filed: Jan. 13, 2021

(65) Prior Publication Data

US 2021/0333906 A1 Oct. 28, 2021

(30) Foreign Application Priority Data

Apr. 24, 2020 (KR) .................. 10-2020-0050051
Nov. 4, 2020 (KR) .................. 10-2020-0145967

(51) Int. Cl.
*G06F 3/045* (2006.01)
*G06F 21/32* (2013.01)
*G06F 3/041* (2006.01)

(52) U.S. Cl.
CPC .............. *G06F 3/045* (2013.01); *G06F 21/32* (2013.01); *G06F 3/0416* (2013.01)

(58) Field of Classification Search
CPC ........ G06F 3/045; G06F 21/32; G06F 3/0416; G06F 21/45; G06F 1/1684;
(Continued)

(56) References Cited

U.S. PATENT DOCUMENTS 6,181,808 B1 * 1/2001 Fukuzumi ............... G07C 9/37
382/126
10,624,561 B2 4/2020 Foxlin et al.
(Continued)

FOREIGN PATENT DOCUMENTS

KR 101607432 B1 3/2016
KR 101697177 B1 1/2017
(Continued)

OTHER PUBLICATIONS

S. W. Baik et al., "Implementation of Bioelectric Impedance Measurement System using Multi-Frequency Applying Method and Two-Electrode Method," International Conference on Chemistry, Biomedical and Environment Engineering (ICCBEE'14), Oct. 7-8, 2014, pp. 10-15; Antalya (Turkey).
(Continued)

*Primary Examiner* — Richard J Hong

(57) ABSTRACT

Disclosed is an electronic device. The electronic device includes an impedance measuring unit including electrodes, that applies a first measurement signal of a first frequency to a user, obtains first biometric impedance data, based on first electrodes among the electrodes, and obtains second biometric impedance data, based on second electrodes among the electrodes, and a signal processor that extracts first feature data of the user, based on the first biometric impedance data and the second biometric impedance data. The first feature data may be based on a ratio between a value of the first biometric impedance data and a value of the second biometric impedance data.

12 Claims, 9 Drawing Sheets

(58) Field of Classification Search
CPC . A61B 5/14535; A61B 5/6826; A61B 5/6898; A61B 5/7246; G16H 40/67; G06K 9/0012; G06K 9/00362; G06N 3/08; G06N 3/0454; G07C 9/37
See application file for complete search history.

(56) References Cited

U.S. PATENT DOCUMENTS

| | | | | |
|---|---|---|---|---|
| 2010/0328033 | A1* | 12/2010 | Kamei | G06K 9/00362 340/5.82 |
| 2011/0080181 | A1* | 4/2011 | Sato | A61B 5/14535 324/692 |
| 2012/0130645 | A1* | 5/2012 | Garudadri | G16H 40/67 702/19 |
| 2015/0074797 | A1* | 3/2015 | Choi | G06F 21/32 726/19 |
| 2016/0191517 | A1* | 6/2016 | Bae | A61B 5/7246 726/7 |
| 2016/0228064 | A1* | 8/2016 | Jung | G06F 1/1684 |
| 2016/0235341 | A1* | 8/2016 | Choi | A61B 5/6898 |
| 2017/0091595 | A1* | 3/2017 | Wang | G06N 3/0454 |
| 2017/0147864 | A1* | 5/2017 | Ahn | G06F 21/32 |
| 2018/0042557 | A1* | 2/2018 | Park | A61B 5/6826 |
| 2018/0181734 | A1* | 6/2018 | Vilenskii | G06F 21/45 |
| 2019/0336070 | A1 | 11/2019 | Youm et al. | |
| 2019/0370444 | A1* | 12/2019 | Jeong | G06K 9/0012 |
| 2020/0019690 | A1 | 1/2020 | Sim et al. | |
| 2020/0201971 | A1* | 6/2020 | Wei | G06N 3/08 |

FOREIGN PATENT DOCUMENTS

| | | |
|---|---|---|
| KR | 102009463 B1 | 8/2019 |
| KR | 20190100020 A | 8/2019 |

OTHER PUBLICATIONS

H. W. Noh et al., "Ratiometric Impedance Sensing of Fingers for Robust Identity Authentication," Scientific Reports, Sep. 19, 2019; pp. 1-12; vol. 9:13566.

* cited by examiner

ND RATIOMETRIC
FREQUENCY-BASED RATIOMETRIC FEATURE EXTRACTION DEVICE FOR USER AUTHENTICATION

CROSS-REFERENCE TO RELATED APPLICATIONS

This application claims priority under 35 U.S.C. § 119 to Korean Patent Application Nos. 10-2020-0050051 filed on Apr. 24, 2020, and 10-2020-0145967 filed on Nov. 4, 2020, respectively, in the Korean Intellectual Property Office, the disclosures of which are incorporated by reference herein in their entireties.

BACKGROUND

Embodiments of the present disclosure described herein relate to an electronic device, and more particularly, relate to an electronic device for extracting ratiometric feature data, based on a biometric impedance of a user.

A biometric authentication technology is a technology that verifies a user's identity by determining a user's physical feature. The biometric authentication technology may be classified into an image-based technology using features such as fingerprints, faces, and irises, and a frequency-based technology using acoustic signals or electrical signals.

Image data such as faces and fingerprints are difficult to change after being registered for identification. Therefore, in the image-based biometric authentication technology, when data required for the biometric authentication are stolen, it is practically impossible to discard the stolen data. Meanwhile, in the frequency-based biometric authentication technology that utilizes a frequency transfer characteristic, even if data required for biometric authentication are stolen, replacement data may be generated by modulating the frequency, and the stolen data may be discarded accordingly. Therefore, a reliability of the frequency-based biometric authentication technology is relatively higher.

SUMMARY

Embodiments of the present disclosure provide an electronic device for extracting ratiometric feature data, based on a biometric impedance.

According to an embodiment of the present disclosure, an electronic device includes an impedance measuring unit including electrodes, that applies a first measurement signal of a first frequency to a user, obtains first biometric impedance data, based on first electrodes among the electrodes, and obtains second biometric impedance data, based on second electrodes among the electrodes, and a signal processor that extracts first feature data of the user, based on the first biometric impedance data and the second biometric impedance data. The first feature data may be based on a ratio between a value of the first biometric impedance data and a value of the second biometric impedance data.

According to another embodiment of the present disclosure, an electronic device includes an impedance measuring unit including electrodes, that generates a first measurement signal of a first frequency and a second measurement signal of a second frequency, applies the first measurement signal and the second measurement signal to a user, and obtains each of first biometric impedance data to fourth biometric impedance data, based on one of first electrodes and second electrodes of the electrodes, and a signal processor that extracts first feature data of the user, based on the first biometric impedance data to the fourth biometric impedance data. The first feature data may be based on a ratio between values of any two data among the first biometric impedance data to the fourth biometric impedance data.

BRIEF DESCRIPTION OF THE FIGURES

The above and other objects and features of the present disclosure will become apparent by describing in detail embodiments thereof with reference to the accompanying drawings.

DETAILED DESCRIPTION

Figure 1:
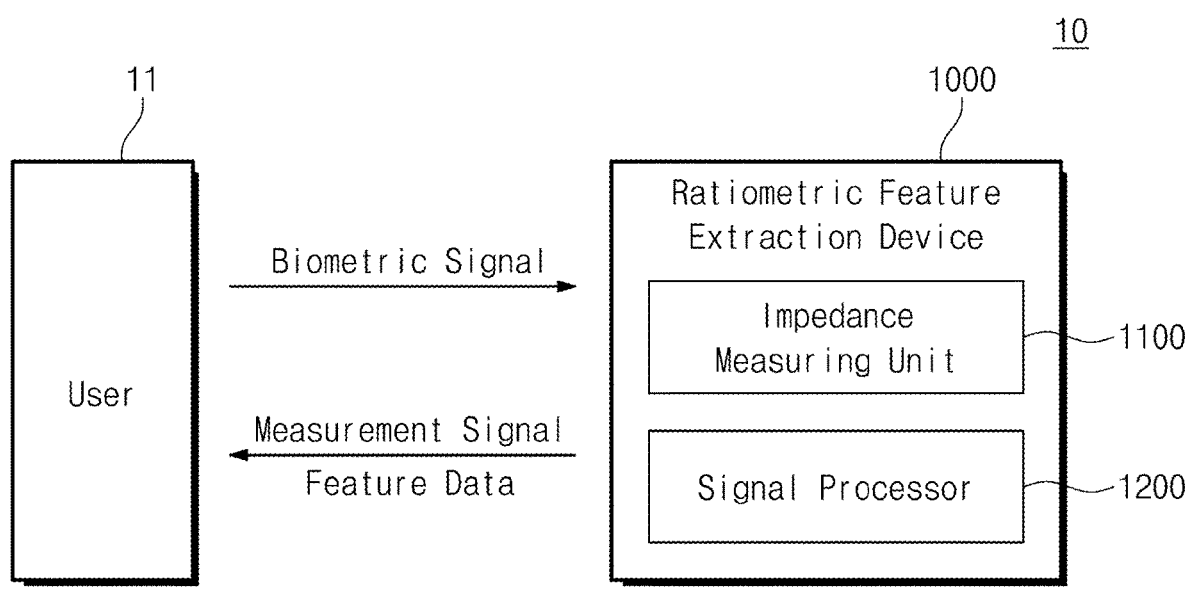
FIG. 1 is a block diagram illustrating a feature extraction system according to an embodiment of the present disclosure.

Hereinafter, embodiments of the present disclosure will be described clearly and in detail such that those skilled in the art may easily carry out the present disclosure.

Hereinafter, preferred embodiments of the present disclosure will be described in more detail with reference to the accompanying drawings. In describing the present disclosure, similar reference numerals will be used for similar elements in the drawings in order to facilitate an overall understanding, and redundant descriptions for similar elements will be omitted.

FIG. 1 is a block diagram illustrating a feature extraction system according to an embodiment of the present disclosure. Referring to FIG. 1, a feature extraction system 10 may include a user 11 and a ratiometric feature extraction device 1000.

The ratiometric feature extraction device 1000 may include an impedance measuring unit 1100 and a signal processor 1200. The impedance measuring unit 1100 may apply a measurement signal to the user 11. For example, the measurement signal may be an electrical signal such as a current having a fine magnitude. The impedance measuring unit 1100 may receive (or measure) a biometric signal corresponding to the applied measurement signal from the user 11. For example, the biometric signal may be an electrical signal corresponding to the applied measurement signal. In one embodiment, the biometric signal obtained from the user 11 may be related to a magnitude of a biometric impedance corresponding to a path through which the measurement signal is applied into a body of the user 11.

The signal processor 1200 may extract feature data indicating an identity of the user 11, based on the received biometric signal. For example, the signal processor 1200 may process the received biometric signal in a ratiometric manner, and may normalize the processed biometric signal. The signal processor 1200 may return the feature data to the user 11.

In an embodiment, the ratiometric feature extraction device 1000 may provide an output corresponding to a ratio between input values. In other words, the feature data output from the ratiometric feature extraction device 1000 may be ratiometric. For example, the ratiometric feature extraction device 1000 may generate the feature data by calculating a ratio between biometric impedance data corresponding to biometric signals.

In an embodiment, the signal processor 1200 may provide the feature data to an external device of the ratiometric feature extraction device 1000. The external device may perform a biometric authentication (recognition) by using the feature data acquired from the ratiometric feature extraction device 1000.

Figure 2:
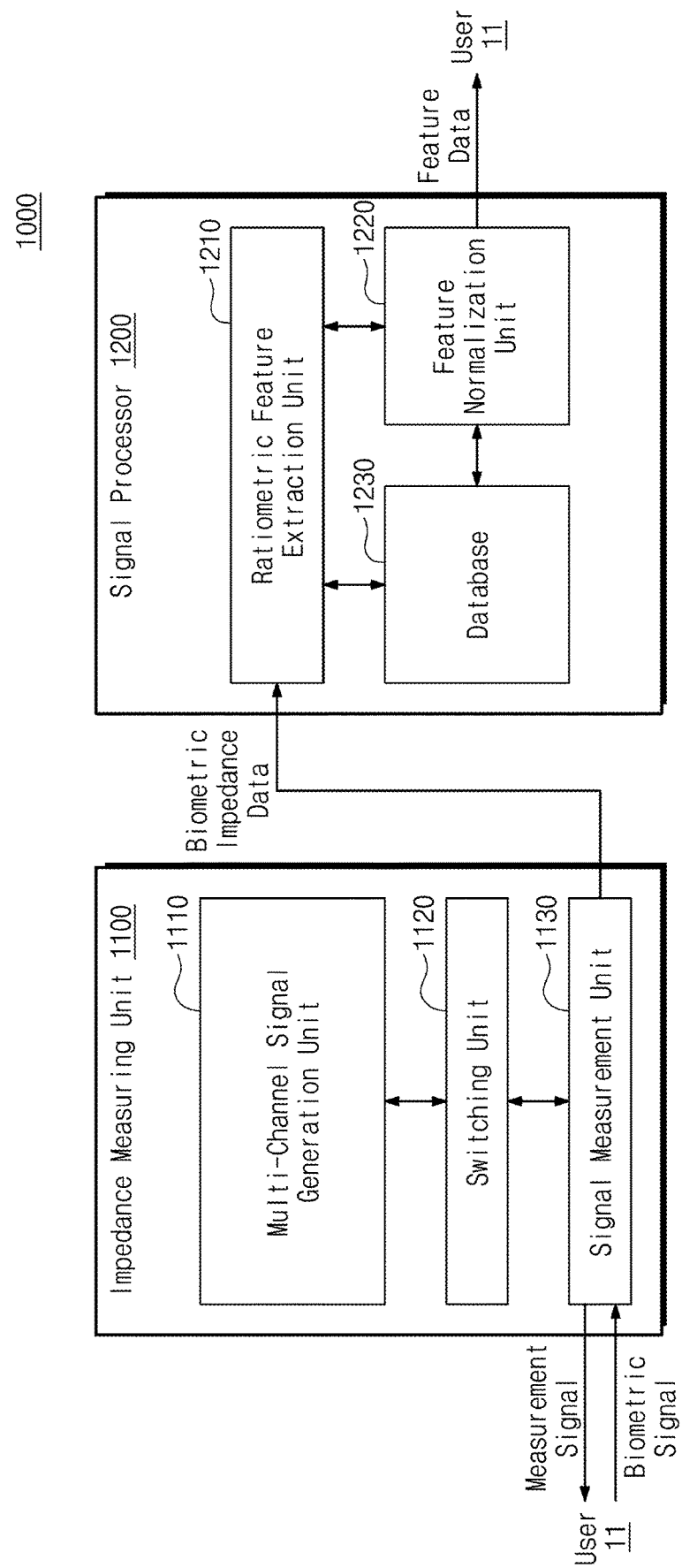
FIG. 2 is a block diagram of a ratiometric feature extraction device of FIG. 1.

FIG. 2 is a block diagram of the ratiometric feature extraction device 1000 of FIG. 1. Referring to FIGS. 1 and 2, the impedance measuring unit 1100 may include a multi-channel signal generation unit 1110, a switching unit 1120, and a signal measurement unit 1130. The signal processor 1200 may include a ratiometric feature extraction unit 1210, a feature normalization unit 1220, and a database 1230.

The multi-channel signal generation unit 1110 of the impedance measuring unit 1100 may generate the electric signal having various waveforms and frequencies. For example, the multi-channel signal generation unit 1110 may generate the current having a fine magnitude. The magnitude of the current generated by the multi-channel signal generation unit 1110 may be a magnitude suitable for applying to the human body. The multi-channel signal generation unit 1110 may variously modulate a frequency and a waveform of the generated current.

The switching unit 1120 may transmit the measurement signal generated by the multi-channel signal generation unit 1110 to the signal measurement unit 1130. For example, the switching unit 1120 may sequentially transmit a plurality of measurement signals to the signal measurement unit 1130. The switching unit 1120 may allow the signal measurement unit 1130 sequentially to acquire the biometric impedance data based on the biometric signal. Accordingly, measurement signals of various types and frequencies output from the multi-channel signal generation unit 1110 may be sequentially applied to the user 11 by the signal measurement unit 1130, and the biometric impedance data corresponding to the measurement signals may be sequentially obtained.

The signal measurement unit 1130 may apply the measurement signal generated by the multi-channel signal generation unit 1110 to the user 11 under a control of the switching unit 1120. For example, the signal measurement unit 1130 may apply the measurement signal to a portion of the body of the user 11 in contact with the signal measurement unit 1130. The signal measurement unit 1130 may measure the biometric signal corresponding to the applied measurement signal from the user 11. For example, the biometric signal may be an electrical signal associated with a magnitude of a biometric impedance based on a path through which the measurement signal moves in the body of the user 11. The signal measurement unit 1130 may transmit the biometric impedance data corresponding to the biometric signal measured from the user 11 to the signal processor 1200 under a control of the switching unit 1120.

The ratiometric feature extraction unit 1210 of the signal processor 1200 may receive the biometric impedance data from the signal measurement unit 1130. The ratiometric feature extraction unit 1210 may generate ratiometric intermediate data, based on the biometric impedance data. For example, the ratiometric feature extraction unit 1210 may calculate a ratio between the biometric impedance data with respect to each frequency of the measurement signal and all paths that the switching unit 1120 and the signal measurement unit 1130 may configure. The ratiometric feature extraction unit 1210 may store the generated intermediate data in the database 1230.

The feature normalization unit 1220 may generate the feature data, based on the intermediate data stored in the database 1230. For example, the feature normalization unit 1220 may normalize the intermediate data of the user 11, based on an intermediate data set of a plurality of users stored in the database 1230. The feature normalization unit 1220 may transmit the generated feature data to the user 11.

The database 1230 may store the intermediate data generated by the ratiometric feature extraction unit 1210. For example, the database 1230 may store the intermediate data set of a plurality of users. In the illustrated embodiment, the database 1230 is included in the signal processor 1200, but the database 1230 may be implemented as an external device of the signal processor 1200 or the ratiometric feature extraction device 1000.

Figure 3:
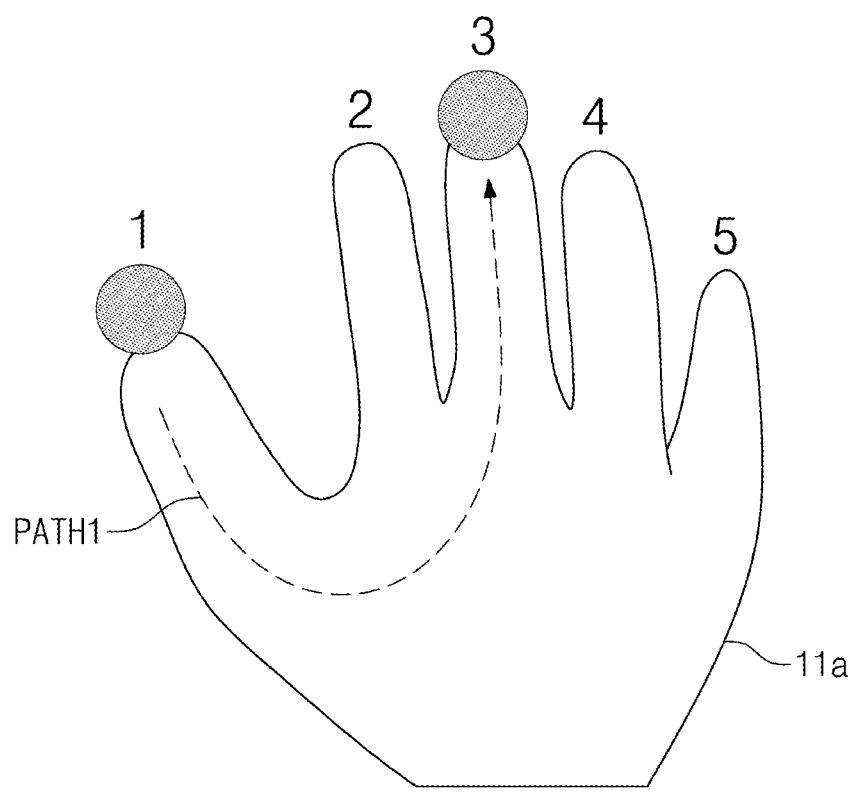
FIG. 3 is a diagram illustrating a combination for obtaining biometric impedance data of FIG. 2.

FIG. 3 is a diagram illustrating a combination for obtaining biometric impedance data of FIG. 2. Referring to FIGS. 1 to 3, the ratiometric feature extraction device 1000 may apply the measurement signal to a portion of a hand 11a of the user 11. In the illustrated embodiment, the ratiometric feature extraction device 1000 may apply the measurement signal to any one of the end points of fingers 1, 2, 3, 4, and 5 of the hand 11a. However, the portion of the ratiometric feature extraction device 1000 to which the measurement signal may be applied is not limited to a fingertip. For example, the ratiometric feature extraction device 1000 may apply the measurement signal to an arbitrary point on the hand 11a such as a palm or a back of the hand.

In the illustrated embodiment, the ratiometric feature extraction device 1000 may measure the biometric impedance of the user 11 by using ends of any two fingers of the fingers 1, 2, 3, 4, and 5 of the hand 11a. In this case, the number of possible combinations (or the number of cases) of biometric impedance data that may be obtained by the ratiometric feature extraction device 1000 is $_5C_2$, that is, 10 pieces (in the illustrated embodiment, it is assumed that the ratiometric feature extraction device 1000 includes a sufficient number of measurement units (e.g., electrodes 1131 of FIG. 4) to measure the biometric signals for all 10 combinations.).

For example, the ratiometric feature extraction device 1000 may apply the measurement signal of a first frequency to the end of the thumb 1 and may obtain the biometric signal from the end of the middle finger 3 (i.e., a first combination (1, 3)). Accordingly, the biometric impedance of a first path PATH1 corresponding to the first combination may be measured. The ratiometric feature extraction device 1000 may measure the biometric impedance, respectively by sequentially applying measurement signals of various frequencies with respect to all possible combinations (i.e., paths).

The ratiometric feature extraction device 1000 may calculate ratios between the measured biometric impedances for each frequency. The calculated ratios may be ratiometric feature values. Assuming that the measurement frequency is 'k', a ratiometric feature value $f_{ij}^k$ of the frequency 'k' extracted for a j-th path of an i-th path may be calculated as follows:

$$f_{ij}^k = f_i^k / f_j^k \qquad \text{[Equation 1]}$$

In this case, 'i' and 'j' may be any one different from among all possible paths (in the illustrated embodiment, any one different from among the first path PATH1 to a tenth path). The ratiometric feature value $f_i^k$ may be a biometric impedance value obtained by applying the measurement signal having the frequency of 'k' to the i-th path.

For example, the ratiometric feature extraction device 1000 may each calculate ratios of a biometric impedance value corresponding to the first path PATH1 obtained by applying the measurement signal of the first frequency to the biometric impedance values corresponding to other paths obtained by applying the measurement signal of the first frequency. In the illustrated embodiment, since the number of all possible paths is 10, the ratiometric feature values extracted for the first frequency are $_{10}C_2$, that is, 45.

The ratiometric feature extraction device 1000 may store the ratiometric feature values in the database 1230. The database 1230 may store ratiometric feature values for not only the user 11 but also various users. The ratiometric feature extraction device 1000 may normalize the ratiometric feature values of a user (e.g., the user 11) who wants to extract the feature data by using the ratiometric feature values of a plurality of users. For example, the ratiometric feature value $f_{ij}^k$ of the frequency 'k' calculated from Equation 1 above extracted for the j-th path of the i-th path may be normalized as follows:

$$f^k_{ij_{norm}} = f_{ij}^k / \{(\Sigma^H_{x=1} f_{ij}^k(x))/H\} \qquad \text{[Equation 2]}$$

In the above equation, 'H' may be the total number of users stored in the database 1230, that is, the number of (accumulated) measurement objects of the ratiometric feature extraction device 1000. The set $f^k_{norm}$ of the normalized feature value $f^k_{ij_{norm}}$ may be provided to the user 11 as the feature data for the frequency 'k' of the user 11.

An external device of the ratiometric feature extraction device 1000 may perform the biometric authentication using the feature data. For example, a classification algorithm (e.g., a machine learning) may be performed on the feature data of the plurality of users. In one embodiment, an algorithm such as a Linear Support Vector Machine (LSVM), a Quadratic Support Vector Machine (QSVM), a K-Neareast Neighbor (KNN), or an Ensemble-bagged trees (Bag Trees) may be used to classify the feature data of the plurality of users.

The ratiometric feature extraction device 1000 may extract the feature data, that is, the identity data, of the user 11 by using the biometric impedance data of the user 11, that is, frequency data instead of using image data such as a face image or an iris image of the user 11. A frequency-based biometric recognition system is more difficult to duplicate data than an image-based biometric recognition system. Also, unlike the image-based biometrics recognition system, the frequency-based biometric recognition system may discard stolen data and generate replacement data for performing the authentication. Accordingly, the biometric recognition system with improved reliability may be provided.

The ratiometric feature extraction device 1000 may extract the feature data using the biometric impedance signal measured by applying a fine current among the various biometric signals (e.g., EEG, ECG signals, etc.) that may be provided from the user 11. Accordingly, the feature data that are relatively less sensitive to changes in the mental and physical state of the user 11, such as changes in emotions of the user 11, exercise, or deterioration in health, may be extracted. In addition, since electrical properties of a cellular tissue resulting from factors such as distribution of intracellular and extracellular fluid, movement of ions in the body tissue, etc. may be variously determined for each person, the biometric impedance data may be more suitable for classification than other biometric based data.

The ratiometric feature extraction device 1000 may extract the feature data by applying measurement signals of various frequencies to various paths in the body, obtaining a plurality of biometric impedance data, calculating ratios between the biometric impedance data, and normalizing the calculated ratios. Accordingly, changes in the biometric impedance data depending on changes in the body such as body temperature or moisture in the body, and environmental factors such as humidity or temperature may be corrected. As a result, the ratiometric feature extraction device 1000 may provide more reliable feature data to the user 11. Accordingly, the user 11 may use the biometric recognition with improved accuracy and reliability.

Figure 4:
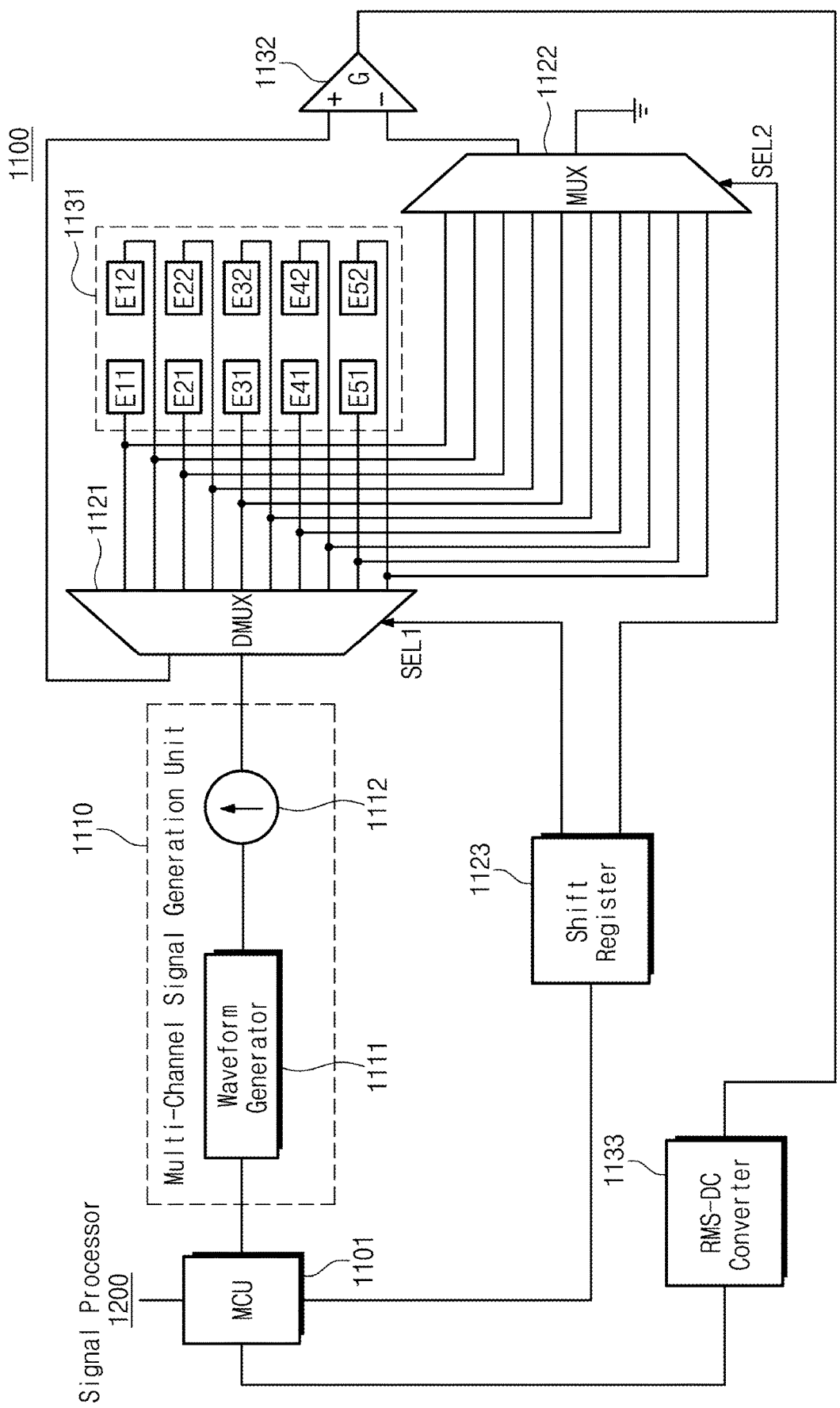
FIG. 4 is a circuit diagram illustrating an impedance measuring unit of FIG. 2.

FIG. 4 is a circuit diagram illustrating an impedance measuring unit of FIG. 2. Referring to FIGS. 1 to 4, the multi-channel signal generation unit 1110 of the impedance measuring unit 1100 may include a waveform generator 1111 and a current source 1112. The switching unit 1120 may include a demultiplexer 1121, a multiplexer 1122, and a shift register 1123. The signal measurement unit 1130 may include the electrodes 1131, an amplifier 1132, and an RMS-DC converter 1133.

The impedance measuring unit 1100 may further include a micro controller 1101 (a Micro Controller Unit; MCU). The micro controller 1101 may control components of the impedance measuring unit 1100. For example, the micro controller 1101 may adjust a frequency and a shape of the measurement signal generated from the multi-channel signal generation unit 1110. The micro controller 1101 may control the demultiplexer 1121 and the multiplexer 1122 through the shift register 1123. The micro controller 1101 may control the demultiplexer 1121 and the multiplexer 1122 through the shift register 1123 such that the electrodes 1131 sequentially apply the measurement signals generated by the multi-channel signal generation unit 1110 to the user 11, and sequentially obtain the biometric signals. The micro controller 1101 may provide the biometric impedance data corresponding to the biometric signals obtained from the user 11 to the signal processor 1200.

The waveform generator 1111 of the multi-channel signal generation unit 1110 may generate signals of various waveforms and frequencies to be applied to the body of the user 11 under the control of the micro controller 1101. For example, the waveform generator 1111 may generate a sinusoidal signal. For another example, the waveform generator 1111 may generate a signal having a frequency in the range of 20 kHz to 500 kHz. In one embodiment, the waveform generator 1111 may be implemented with a waveform generator programmable (e.g., a frequency may be adjusted by the micro controller 1101) by the micro controller 1101.

The current source 1112 may convert signals generated from the waveform generator 1111 into current. For example, the current source 1112 may output a uniform current, based on the signal applied from the waveform generator 1111. In one embodiment, the current source 1112 may be implemented with a voltage-controlled current source (VCCS).

The demultiplexer 1121 may apply the measurement signals output from the current source 1112 to the electrodes 1131 in response to a selection signal SEL1 generated from the shift register 1123, and may transmit the biometric signal measured from the electrodes 1131 to one input terminal (e.g., a non-inverting input terminal) of the amplifier 1132.

The multiplexer 1122 may apply a ground voltage to one of the electrodes 1131 in response to a selection signal SEL2 generated from the shift register 1123, and may transmit the biometric signal measured from the electrodes 1131 to another input terminal (e.g., an inverting input terminal) of the amplifier 1132. The shift register 1123 may generate the selection signals SEL1 and SEL2 under a control of the micro controller 1101 and may provide them to the demultiplexer 1121 and the multiplexer 1122, respectively.

Under the control of the micro controller 1101, the electrodes 1131 may apply measurement signals to the body of the user 11 and may measure the biometric signals corresponding to the applied measurement signals from the user 11. The electrodes 1131 may include one or more electrode groups. In the illustrated embodiment, the electrodes 1131 include five electrode groups, and each of the electrode groups includes two electrodes (e.g., an electrode E11 and an electrode E12). However, the number of electrode groups and the number of electrodes included in each of the electrode groups are not limited thereto.

The number of paths through which the biometric signal may be measured by the impedance measuring unit 1100 may be related to the number 'n' of the electrodes 1131. In an embodiment, the impedance measuring unit 1100 may obtain the biometric signal from the user 11 by using two electrode groups. In this case, the total number of possible paths may be $_nC_2$.

For example, it is assumed that a first measurement signal having a first frequency is generated from the multi-channel signal generation unit 1110. The first measurement signal may be applied to the electrode E11 of the first electrode group through the demultiplexer 1121. Accordingly, the first measurement signal may be applied as the portion of the body in contact with the electrode E11 of the user 11. For example, in the embodiment illustrated in FIG. 3, the first measurement signal may be applied to the thumb 1 through the electrode E11. In this case, the first electrode group will be understood as an electrode group corresponding to the thumb 1.

In the above example, to obtain the biometric impedance data corresponding to the first path PATH1 based on the first combination (1, 3), the electrode E12 may be connected to the non-inverting input terminal of the amplifier 1132 through the demultiplexer 1121. The ground voltage may be applied through the multiplexer 1122 to one electrode of the electrode group corresponding to the middle finger 3. Another electrode of the electrode group corresponding to the middle finger 3 may be connected to the inverting input terminal of the amplifier 1132 through the multiplexer 1122. Accordingly, a voltage difference of the first path PATH1 due to the first measurement signal, that is, the biometric signal based on the biometric impedance of the first path PATH1 may be measured (or obtained) through the amplifier 1132.

In a similar manner, the micro controller 1101 may control other components of the impedance measuring unit 1100 to sequentially apply one or more measurement signals having various frequencies to the user 11 through the electrodes 1131 on the first path PATH1. In addition, the micro controller 1101 may control other components of the impedance measuring unit 1100 to sequentially apply one or more measurement signals to different paths (e.g., paths corresponding to a combination of thumb 1 and ring finger 4). For example, the micro controller 1101 may switch a connection relationship among the multi-channel signal generation unit 1110, the electrodes 1131, the ground voltage, and the amplifier 1132 by controlling the shift register 1123.

The amplifier 1132 may amplify the measured biometric signal. The amplifier 1132 may transmit the amplified biometric signal to the RMS-DC converter 1133.

The RMS-DC converter 1133 may convert the biometric signal output from the amplifier 1132. For example, the RMS-DC converter 1133 may convert the biometric signal measured as an RMS signal (or an AC (alternating current) signal) into a DC (direct current) signal. The RMS-DC converter 1133 may transmit the converted biometric signal to the micro controller 1101.

The micro controller 1101 may transmit the biometric signal converted by the RMS-DC converter 1133 to the signal processor 1200. In an embodiment, the micro controller 1101 may include an analog-to-digital converter (ADC). The micro controller 1101 may convert the biometric signal, which is an analog signal (e.g., voltage), into a digital signal by using the ADC. The micro controller 1101 may transmit the biometric signal converted into the digital signal as biometric impedance data to the signal processor 1200.

Figure 5:
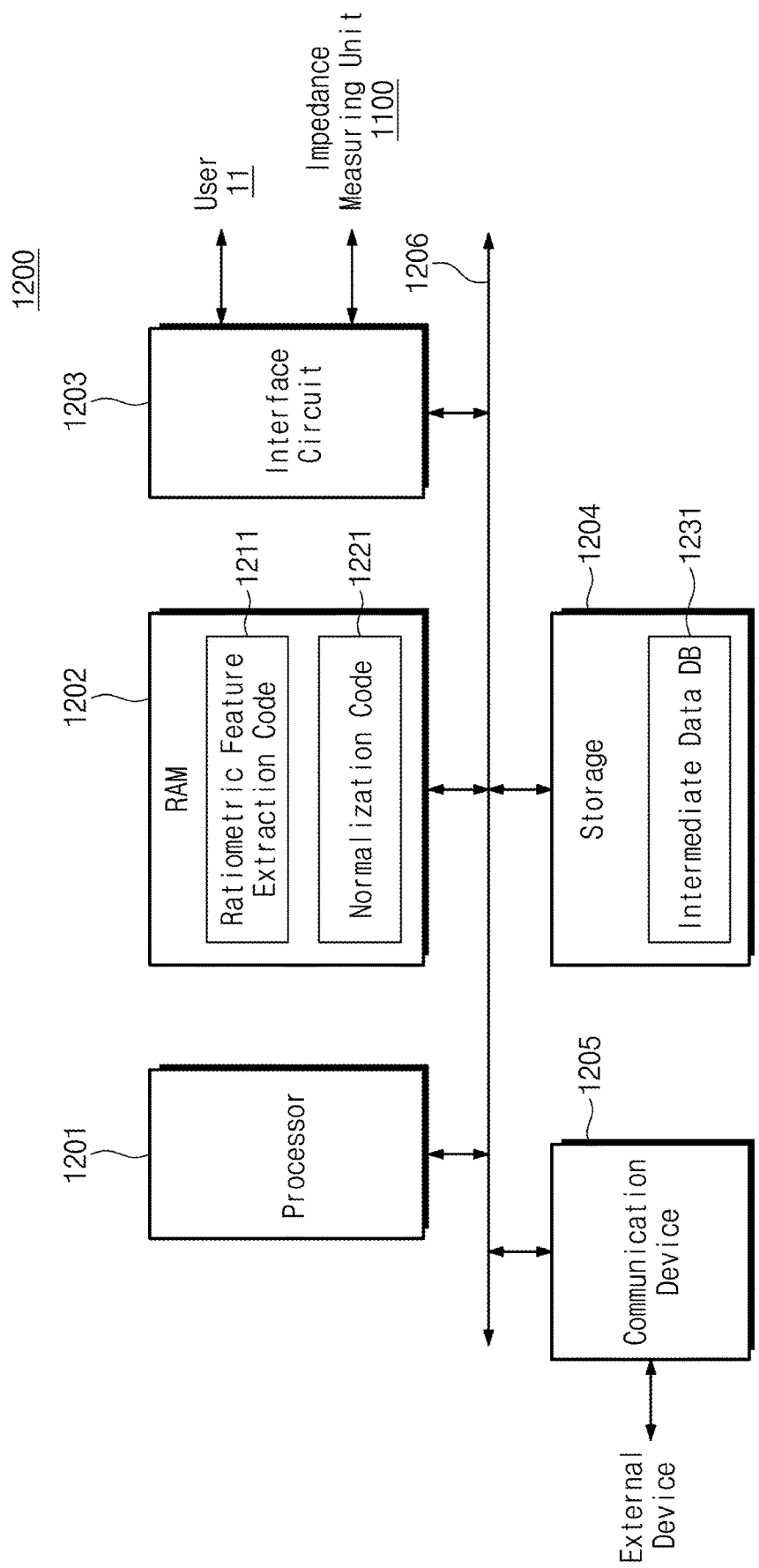
FIG. 5 is a block diagram illustrating a signal processor of FIG. 2.

FIG. 5 is a block diagram illustrating a signal processor of FIG. 2. The signal processor 1200 may include a processor 1201, a random access memory (RAM) 1202, an interface circuit 1203, storage 1204, a communication device 1205, and a bus 1206.

The processor 1201 may perform an operation for executing various software, firmware, or program code loaded into the RAM 1202. For example, the processor 1201 may execute codes for processing the biometric impedance data obtained by the impedance measuring unit 1100. For another example, the processor 1201 may generate instructions for controlling the impedance measuring unit 1100 and may transmit the generated instructions to the impedance measuring unit 1100 through the interface circuit 1203. The processor 1201 may perform a function as a central processing unit (CPU) of the ratiometric feature extraction device 1000. The processor 1201 may also be referred to as a digital signal processor (DSP).

The RAM 1202 may store data and program codes to be processed or processed by the processor 1201. The RAM 1202 may functions as a main memory device of the processor 1201. For example, program code such as a ratiometric feature extraction code 1211 and a normalization code 1221 stored in the storage 1204 may be loaded into the RAM 1202. In an embodiment, the RAM 1202 may include a Dynamic Random Access Memory (DRAM) or a Static Random Access Memory (SRAM). The RAM 1202 may also be referred to as a buffer memory, a working memory, or a cache memory. Unlike illustrated, the number of the RAM 1202 may be one or more. The RAM 1202 may be understood as a non-transitory computer-readable medium storing code executable by processor 1201.

The ratiometric feature extraction code 1211 loaded in the RAM 1202 and executed by the processor 1201 may include instructions for generating intermediate data by calculating a ratio between the biometric impedance data described above in FIGS. 1 to 3. For example, the processor 1201 may calculate the ratiometric feature values described above in FIGS. 1 to 3 by executing the ratiometric feature extraction code 1211 stored in the RAM 1202. The processor 1201 may store the calculated values as the intermediate data in an intermediate data DB (Database) 1231 in the storage 1204.

The normalization code 1221 loaded in the RAM 1202 and executed by the processor 1201 may include instructions for normalizing the intermediate data described above in FIGS. 1 to 3. For example, the processor 1201 may normalize the ratiometric feature values described above in FIGS.

1 to 3 by executing the normalization code 1221 stored in the RAM 1202. The processor 1201 may provide the normalized values as the feature data to the user 11.

The interface circuit 1203 may communicate with the user 11 and the impedance measuring unit 1100. For example, the interface circuit 1203 converts the biometric impedance data received from the impedance measuring unit 1100 into a format usable in the processor 1201, and may transmit the converted biometric impedance data to the processor 1201 through the bus 1206. In an embodiment, the interface circuit 1203 may communicate with the impedance measuring unit 1100 by using any one of various protocols such as a Peripheral Component Interconnect Express (PCIe) or a Universal Serial Bus (USB).

The interface circuit 1203 may further include a user interface for communicating with the user 11. For example, the interface circuit 1203 may provide the feature data generated by the processor 1201 to the user 11. In an embodiment, the user interface may include at least one of various output devices such as a monitor, a printer, or a lamp. The user interface may include at least one of various input devices such as a keyboard, a touch pad, a mouse, or a microphone.

The storage 1204 may store data generated for long-term storage by the processor 1201, a file to be driven by the processor 1201, or various codes that may be executed by the processor 1201. For example, the storage 1204 may store the ratiometric feature extraction code 1211 and the normalization code 1221 executable by the processor 1201. The storage 1204 may function as an auxiliary memory device of the signal processor 1200. The storage 1204 may include a flash memory, etc. Unlike illustrated, the storage 1204 may be implemented as an external device of the signal processor 1200.

The storage 1204 may include the intermediate data DB 1231. The intermediate data DB 1231 may store the ratiometric feature values generated by the processor 1201 as intermediate data. The intermediate data DB 1231 may store the intermediate data of not only the user 11 but also various users.

The communication device 1205 may communicate with an external device. For example, the communication device 1205 may convert the feature data generated by the processor 1201 into a format usable in the external device, and transmit the converted feature data to the external device. In an embodiment, the communication device 1205 may communicate with the external device in accordance with various wired or wireless communication protocols.

The bus 1206 may provide a communication path among components of the signal processor 1200. The processor 1201, the RAM 1202, and the interface circuit 1203 may exchange data with each other through the bus 1206. The bus 1206 may be configured to support various types of communication formats used in the signal processor 1200.

Figure 6:
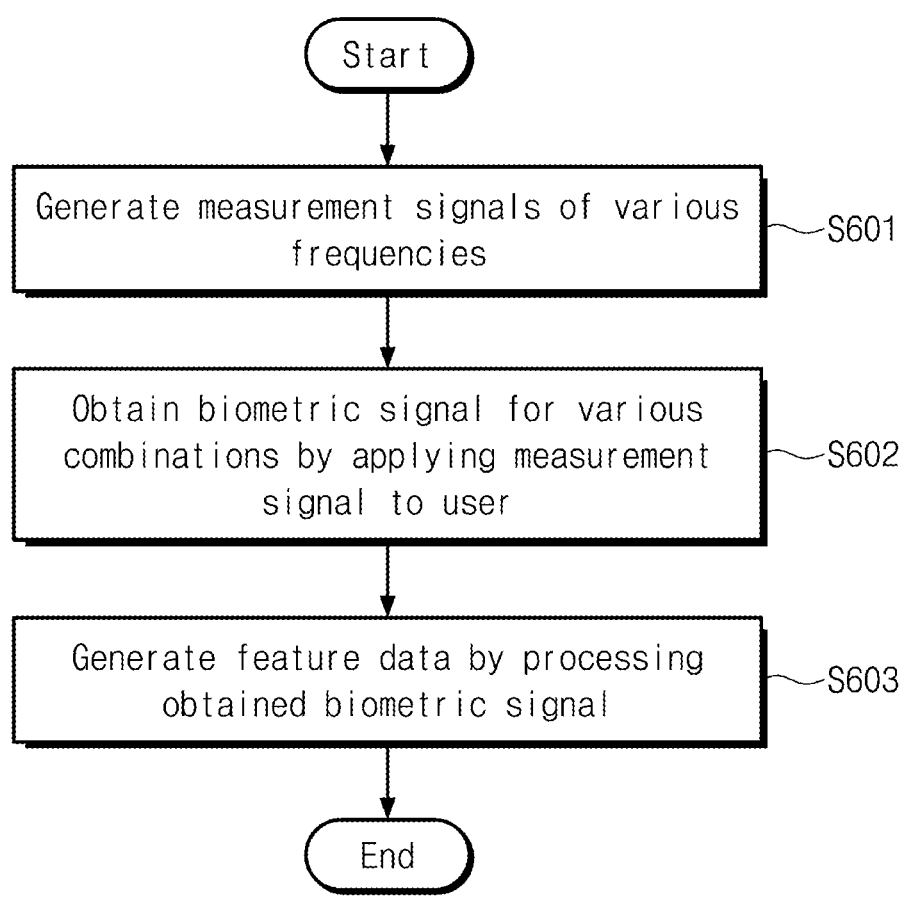
FIG. 6 is a flowchart illustrating a method for extracting a user's feature, based on a biometric impedance according to an embodiment of the present disclosure.

FIG. 6 is a flowchart illustrating a method for extracting a user's feature, based on a biometric impedance according to an embodiment of the present disclosure. Referring to FIGS. 1 to 6, the ratiometric feature extraction device 1000 may perform operations S601 to S603.

In operation S601, the ratiometric feature extraction device 1000 may generate measurement signals of various frequencies. For example, the multi-channel signal generation unit 1110 of the impedance measuring unit 1100 in the ratiometric feature extraction device 1000 may generate a fine current having a magnitude suitable to be applied to the body. The ratiometric feature extraction device 1000 may generate the measurement signal by modulating an electric signal. For example, the multi-channel signal generation unit 1110 of the impedance measuring unit 1100 in the ratiometric feature extraction device 1000 may generate various measurement signals by modulating the frequency and a waveform of the electric signal.

In operation S602, the ratiometric feature extraction device 1000 may obtain the biometric signal for various combinations by applying the measurement signal to the user 11. For example, the signal measurement unit 1130 of the impedance measuring unit 1100 in the ratiometric feature extraction device 1000 may apply the measurement signals generated through the operations S601 and S602 to the user 11 through various paths, and may obtain the biometric signals from the user 11.

In an embodiment, the measurement signals may be sequentially applied one by one to the user 11 through the signal measurement unit 1130. The measurement signals may be generated in various orders and may be applied to the user 11. For example, it is assumed that the first measurement signal is generated in operations S601 and S602. In this case, in operation S603, the first measurement signal is applied to the user 11 through an arbitrary path (e.g., the first path PATH1), and a first biometric signal corresponding thereto from the user 11 may be obtained. Thereafter, the first measurement signal may be applied to the user 11 through another path, and a second biometric signal corresponding thereto may be obtained from the user 11.

For another example, after the first biometric signal corresponding to the first measurement signal is obtained, a second measurement signal having a frequency different from that of the first measurement signal may be generated. The second measurement signal may be applied to the user 11 through the first path. A third biometric signal corresponding thereto may be obtained from the user 11.

For another example, the first measurement signal and the second measurement signal may be simultaneously applied to the user 11 through different electrodes. Alternatively, a plurality of biometric signals may be simultaneously obtained in response to one measurement signal. The impedance measuring unit 1100 may obtain the biometric signals in various ways by switching a connection relationship among the multi-channel signal generation unit 1110, the switching unit 1120, and the signal measurement unit 1130.

In operation S603, the ratiometric feature extraction device 1000 may generate the feature data of the user 11 by processing the obtained biometric signal. Operation S603 will be described later in detail with reference to FIG. 7.

Figure 7:
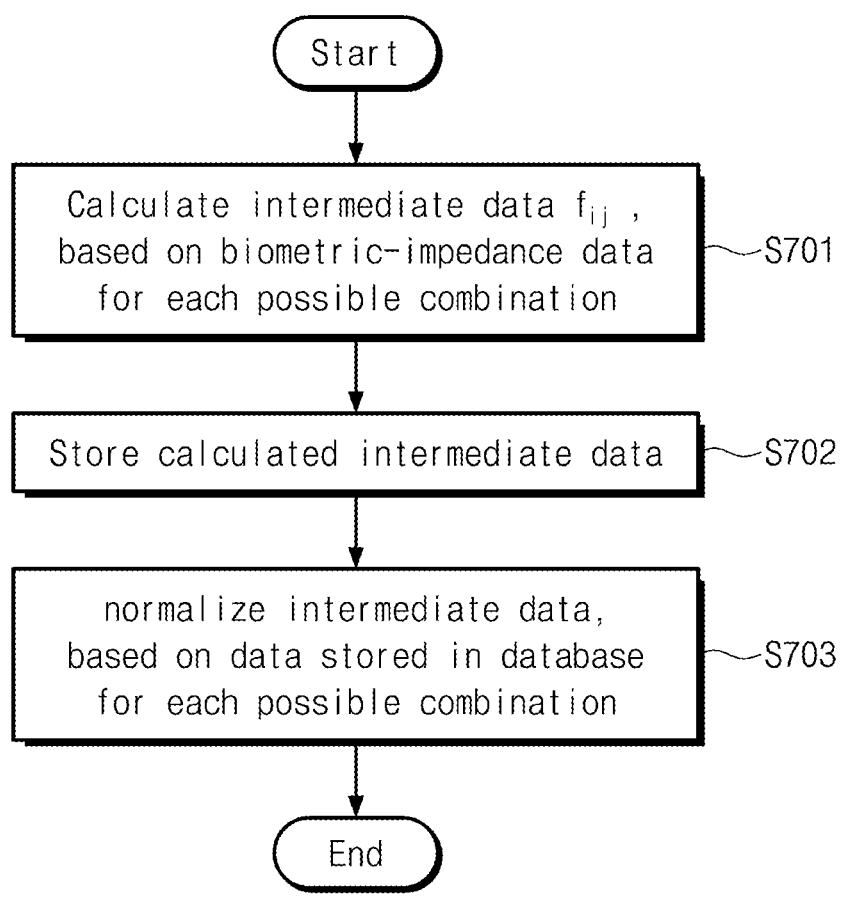
FIG. 7 is a flowchart illustrating a method for generating feature data from a user by processing a biometric signal according to an embodiment of the present disclosure.
Figure 8:
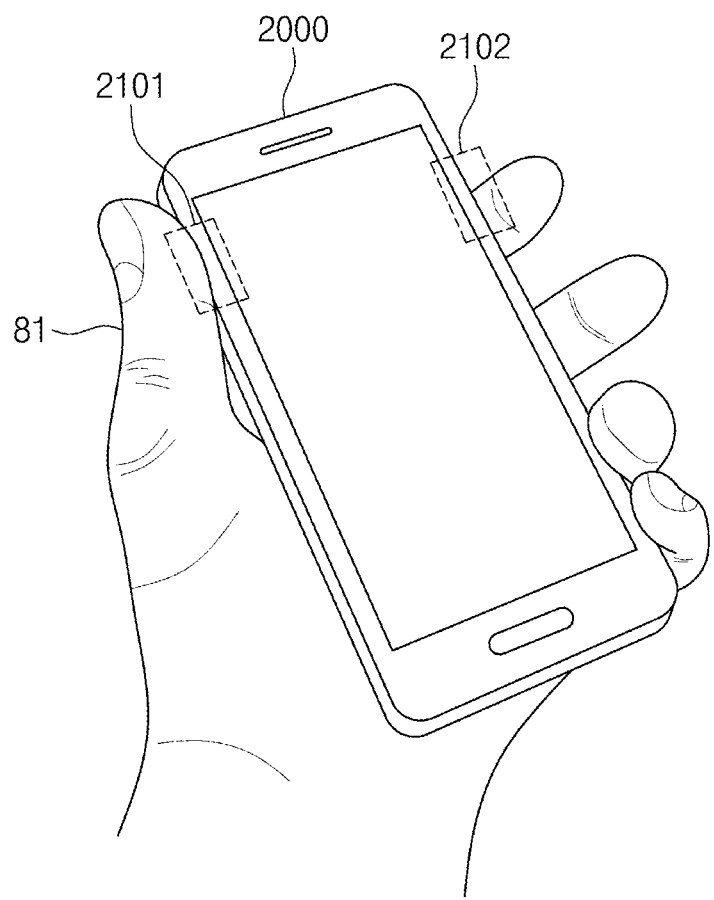
FIG. 8 is a diagram illustrating an electronic device according to an embodiment of the present disclosure.

FIG. 7 is a flowchart illustrating a method for generating feature data from a user by processing a biometric signal according to an embodiment of the present disclosure. Referring to FIGS. 1 to 7, the ratiometric feature extraction device 1000 may perform operations S701 to S703.

In operation S701, the ratiometric feature extraction device 1000 may calculate the intermediate data, based on the biometric impedance data for each possible combination. For example, the signal processor 1200 of the ratiometric feature extraction device 1000 may calculate the ratiometric feature value $f_{ij}^{k}$ extracted for the j-th path of the i-th path of the frequency 'k' by using Equation 1 described above with reference to FIG. 3.

In operation S702, the ratiometric feature extraction device 1000 may store the calculated intermediate data. For example, the signal processor 1200 of the ratiometric feature extraction device 1000 may store the calculated ratiometric feature values $f_{ij}^{k}$ as the intermediate data in the database 1230.

In operation S703, the ratiometric feature extraction device 1000 may normalize the intermediate data, based on data stored in the database 1230 for each possible combination. For example, the signal processor 1200 of the ratiometric feature extraction device 1000 may normalize the intermediate data of the user 11, based on the intermediate data set stored in the database 1230 by using Equation 2 described above with reference to FIG. 3, FIG. 8 is a diagram illustrating an electronic device 2000 according to an embodiment of the present disclosure. Referring to FIGS. 1 to 8, the electronic device 2000 may include the ratiometric feature extraction device 1000. The electronic device 2000 may include a first contact part 2101 and a second contact part 2102.

The first contact part 2101 and the second contact part 2102 may correspond to anyone (or two or more) of the electrodes 1131 of FIG. 4. For example, the first contact part 2101 may correspond to a first electrode group including the electrodes E11 and E12, and the second contact part 2102 may correspond to a second electrode group including electrodes E21 and E22. Unlike shown, the electronic device 2000 may include three or more contact parts.

The electronic device 2000 may obtain the biometric impedance data through the first contact part 2101 and the second contact part 2102. The electronic device 2000 may generate the feature data of a user 81, based on the obtained biometric impedance data. The feature data of the user 81 may be used to recognize the user 81. In an embodiment, the electronic device 2000 may be implemented as any one of various portable electronic devices such as a smart phone, a tablet, etc.

Figure 9:
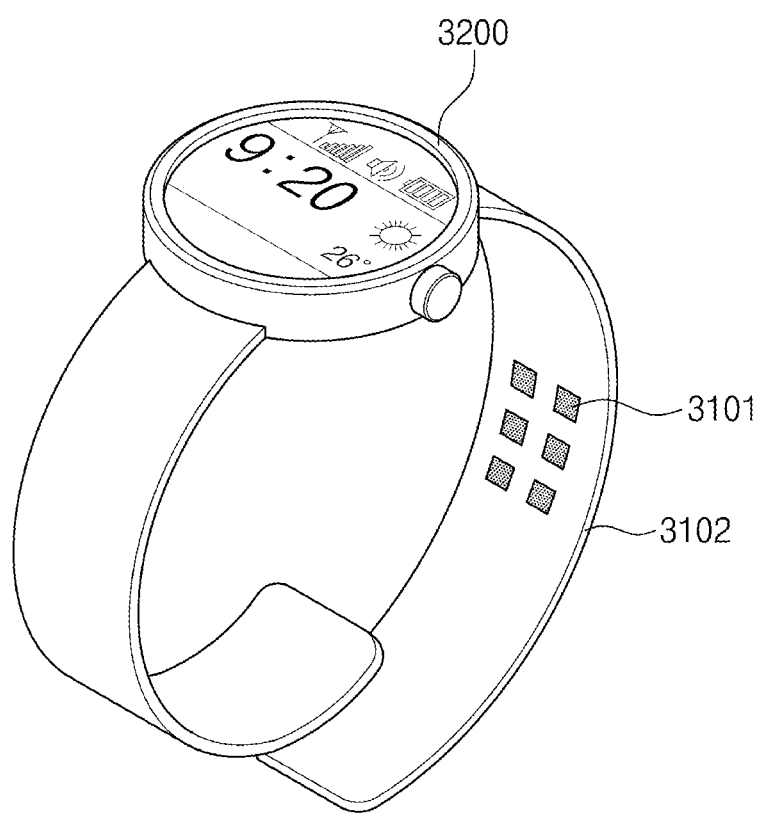
FIG. 9 is a diagram illustrating an electronic device according to another embodiment of the present disclosure.

FIG. 9 is a diagram illustrating an electronic device 3000 according to another embodiment of the present disclosure. Referring to FIGS. 1 to 9, the electronic device 3000 may include the ratiometric feature extraction device 1000. The electronic device 3000 may include a band 3102 including one or more contact parts 3101 and a main body 3200. In an embodiment, the electronic device 3000 may be implemented as a wearable device.

The band 3102 may include at least some components of the impedance measuring unit 1100. For example, the band 3102 may include the electrodes 1131. The contact part 3101 of the band 3102 may correspond to one or more electrode groups among the electrodes 1131. The contact part 3101 may be referred to as an impedance sensor.

The main body 3200 may include at least some components of the signal processor 1200. For example, the main body 3200 may include the processor 1201 and the RAM 1202. The main body 3200 may generate user's feature data, based on the biometric impedance data obtained from the contact part 3101.

According to an embodiment of the present disclosure, an electronic device may extract feature data ratiometrically from biometric impedance data obtained by applying various frequencies. Accordingly, a biometric authentication technology with improved accuracy and security may be provided.

The contents described above are specific embodiments for implementing the present disclosure. The present disclosure may include not only the embodiments described above but also embodiments in which a design is simply or easily capable of being changed. In addition, the present disclosure may also include technologies easily changed to be implemented using embodiments. Therefore, the scope of the present disclosure is not limited to the described embodiments but should be defined by the claims and their equivalents.

While the present disclosure has been described with reference to some embodiments thereof, it will be apparent to those of ordinary skill in the art that various changes and modifications may be made thereto without departing from the spirit and scope of the present disclosure as set forth in the following claims.

What is claimed is:

1. An electronic device comprising:
an impedance measuring unit including electrodes, which applies a first measurement signal of a first frequency to a user, obtains first biometric impedance data based on first electrodes among the electrodes, and obtains second biometric impedance data based on second electrodes among the electrodes; and
a signal processor which extracts first feature data of the user based on the first biometric impedance data and the second biometric impedance data,
wherein the signal processor generates first intermediate data by calculating a ratio of a value of the first biometric impedance data to a value of the second biometric impedance data, and generates the first feature data by normalizing the first intermediate data.

2. The electronic device of claim 1, wherein the impedance measuring unit includes:
a signal generator which generates the first measurement signal; and
a signal measuring unit including the electrodes, which applies the first measurement signal to the user, and obtains the first biometric impedance data and the second biometric impedance data.

3. The electronic device of claim 1, wherein the impedance measuring unit applies the first measurement signal to the user by using third electrodes among the electrodes.

4. The electronic device of claim 1, wherein the signal processor includes a database which stores the first intermediate data.

5. The electronic device of claim 1, wherein the signal processor generates the first feature data by calculating a ratio of the first intermediate data to an average of elements of a first data set associated with the first frequency, the first electrodes, and the second electrodes.

6. The electronic device of claim 1, wherein the first feature data are used for a biometric authentication of the user.

7. An electronic device comprising:
an impedance measuring unit including electrodes, which generates a first measurement signal of a first frequency and a second measurement signal of a second frequency, applies the first measurement signal and the second measurement signal to a user, and obtains each of first biometric impedance data to fourth biometric impedance data; based on one of first electrodes and second electrodes of the electrodes; and
a signal processor which extracts feature data of the user based on the first biometric impedance data to the fourth biometric impedance data,
wherein the feature data are generated based on a ratio between values of any two data among the first biometric impedance data to the fourth biometric impedance data,
wherein the signal processor generates first intermediate data by calculating a ratio of a value of the first biometric impedance data to a value of the second biometric impedance data, and generates first feature data by normalizing the first intermediate data.

8. The electronic device of claim 7, wherein the first frequency is different from the second frequency, and wherein the first electrodes are different from the second electrodes.

9. The electronic device of claim 7, wherein the first biometric impedance data are associated with the first measurement signal and the first electrodes, and the second biometric impedance data are associated with the first measurement signal and the second electrodes.

10. The electronic device of claim 7, further including a database configured to store the first intermediate data.

11. The electronic device of claim 7, wherein the third biometric impedance data are associated with the second measurement signal and the first electrodes, and the fourth biometric impedance data are associated with the second measurement signal and the second electrodes, and
   wherein the signal processor further generates second intermediate data by calculating a ratio of a value of the third biometric impedance data to a value of the fourth biometric impedance data, and generates second feature data by normalizing the second intermediate data.

12. The electronic device of claim 11, wherein the signal processor generates the first feature data by calculating a ratio of the first intermediate data to an average of elements of a first data set associated with the first frequency, the first electrodes, and the second electrodes, and
   wherein the signal processor generates the second feature data by calculating a ratio of the second intermediate data to an average of elements of a second data set associated with the second frequency, the first electrodes, and the second electrodes.

* * * * *